United States Patent
Cline et al.

(10) Patent No.: US 9,684,136 B2
(45) Date of Patent: Jun. 20, 2017

(54) FIBER OPTIC CONNECTOR WITH FERRULE BOOT

(71) Applicant: CORNING OPTICAL COMMUNICATIONS LLC, Hickory, NC (US)

(72) Inventors: Timothy Scott Cline, Granite Falls, NC (US); Marco Antonio Gonzalez Garcia, Reynosa (MX); Wesley Allan Yates, Lenoir, NC (US)

(73) Assignee: Corning Optical Communications LLC, Hickory, NC (US)

( * ) Notice: Subject to any disclaimer, the term of this patent is extended or adjusted under 35 U.S.C. 154(b) by 4 days.

(21) Appl. No.: 14/831,325

(22) Filed: Aug. 20, 2015

(65) Prior Publication Data

US 2015/0355415 A1  Dec. 10, 2015

Related U.S. Application Data

(63) Continuation of application No. 13/285,573, filed on Oct. 31, 2011, now abandoned.

(51) Int. Cl.
*G02B 6/36* (2006.01)
*G02B 6/38* (2006.01)

(52) U.S. Cl.
CPC ........ *G02B 6/3839* (2013.01); *G02B 6/3672* (2013.01); *G02B 6/3885* (2013.01); *G02B 6/3676* (2013.01)

(58) Field of Classification Search
None
See application file for complete search history.

(56) References Cited

U.S. PATENT DOCUMENTS

| | | | |
|---|---|---|---|
| 4,972,042 A | 11/1990 | Seabourne et al. | |
| 5,146,532 A | 9/1992 | Hodge | |
| 5,566,269 A | 10/1996 | Eberle, Jr. et al. | |
| 5,625,737 A | 4/1997 | Saito | |
| 6,456,772 B1 | 9/2002 | Daoud | |
| 6,536,956 B2 | 3/2003 | Luther et al. | |
| 6,580,867 B2 | 6/2003 | Galaj et al. | |
| 6,702,479 B2 | 3/2004 | Yang | |
| 6,801,704 B1 | 10/2004 | Daoud et al. | |
| 6,947,654 B2 | 9/2005 | Krampotich et al. | |
| 7,166,805 B2 | 1/2007 | Robinson et al. | |
| 7,264,402 B2 | 9/2007 | Theuerkorn et al. | |
| 7,394,963 B2 | 7/2008 | Hartlef | |
| 7,418,186 B1 | 8/2008 | Grubish et al. | |
| 7,785,019 B2 | 8/2010 | Lewallen et al. | |
| 8,520,996 B2 * | 8/2013 | Cowen | G02B 6/4459 385/135 |

(Continued)

*Primary Examiner* — Tina Wong (57) ABSTRACT

A fiber optic connector for a plurality of optical fibers includes: a housing portion, a ferrule assembly at least partially disposed in the housing portion, a spring push positioned behind the ferrule, and a spring positioned between the spring push and ferrule. The ferrule assembly includes a ferrule defining an end face of the fiber optic connector and having a plurality of bores arranged in at least two linear rows. The ferrule assembly also includes a ferrule boot coupled to the ferrule, with the ferrule boot including a fiber alignment portion and a cover portion. The fiber alignment portion defines a first groove for a first row of the optical fibers and a second groove for a second row of the optical fibers.

19 Claims, 9 Drawing Sheets

(56) References Cited

U.S. PATENT DOCUMENTS

| | | |
|---|---|---|
| 8,824,850 B2 | 9/2014 | Garcia et al. |
| 2002/0110333 A1 | 8/2002 | Yang |
| 2003/0021548 A1 | 1/2003 | Luther et al. |
| 2003/0132021 A1 | 7/2003 | Gareis |
| 2006/0115218 A1 | 6/2006 | Howard et al. |
| 2006/0204178 A1 | 9/2006 | Theuerkorn et al. |
| 2007/0160327 A1 | 7/2007 | Lewallen et al. |
| 2008/0138026 A1* | 6/2008 | Yow .................. G02B 6/4477 385/137 |
| 2010/0310213 A1 | 12/2010 | Lewallen et al. |
| 2011/0198324 A1* | 8/2011 | de Jong ................ G02B 6/245 219/121.72 |
| 2013/0195406 A1* | 8/2013 | Cooke .............. B29C 45/14467 385/72 |
| 2013/0216185 A1* | 8/2013 | Klavuhn ............. G02B 6/3882 385/60 |

* cited by examiner

FIBER OPTIC CONNECTOR WITH FERRULE BOOT

PRIORITY APPLICATION

This application is a continuation of U.S. patent application Ser. No. 13/285,573 filed on Oct. 31, 2011, the content of which is relied upon and incorporated herein by reference in its entirety, and the benefit of priority under 35 U.S.C. §120 is hereby claimed.

BACKGROUND

Field

The present disclosure generally relates to fiber optic connectors and, more specifically, to fiber optic having a ferrule with one or more linear rows of bores for a plurality of optical fibers.

Technical Background

Many current connectors include a predetermined number of optical fiber inputs such as optical fiber bores or the like. Ferrules for optical fiber and the optical fiber inputs may be arranged such that only properly aligned fibers will cause a connection with adequate data transmission quality. As an example, a multi-fiber connector may be configured with optical fiber inputs that are aligned in a linear fashion with a precise and tightly-spaced geometry. As such, many current solutions include gluing fibers into such a configuration. However, these current solutions often delaminate prior to installing the fiber into the ferrule, which increases processing time and difficulty.

SUMMARY

According to one embodiment, a fiber optic connector for a plurality of optical fibers includes: a housing portion, a ferrule assembly at least partially disposed in the housing portion, a spring push positioned behind the ferrule, and a spring positioned between the spring push and ferrule. The ferrule assembly includes a ferrule defining an end face of the fiber optic connector and having a plurality of bores arranged in at least two linear rows. The ferrule assembly also includes a ferrule boot coupled to the ferrule, with the ferrule boot including a fiber alignment portion and a cover portion. The fiber alignment portion defines a first groove for a first row of the optical fibers and a second groove for a second row of the optical fibers.

According to another embodiment, a fiber optic connector includes: a housing portion, a ferrule assembly at least partially disposed in the housing portion, a spring push positioned behind the ferrule, a spring positioned between the spring push and ferrule. The ferrule assembly includes a ferrule defining an end face of the fiber optic connector and having a plurality of bores arranged in at least two linear rows. The ferrule assembly also includes a ferrule boot coupled to the ferrule, with the ferrule boot including a fiber alignment portion and a cover portion. The fiber optic connector also includes a plurality of optical fibers arranged in at least a first row and a second row. The fiber alignment portion defines a first groove for the first row of optical fibers and a second groove for the second row of optical fibers. The optical pass through an opening in the spring, through the ferrule boot, and into the ferrule.

Additional features and advantages will be set forth in the detailed description which follows, and in part will be readily apparent to those skilled in the art from that description or recognized by practicing the embodiments described herein, including the detailed description which follows, the claims, as well as the appended drawings.

BRIEF DESCRIPTION OF THE DRAWINGS

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate various embodiments described herein, and together with the description serve to explain the principles and operations of the claimed subject matter.

DETAILED DESCRIPTION

Figure 1:
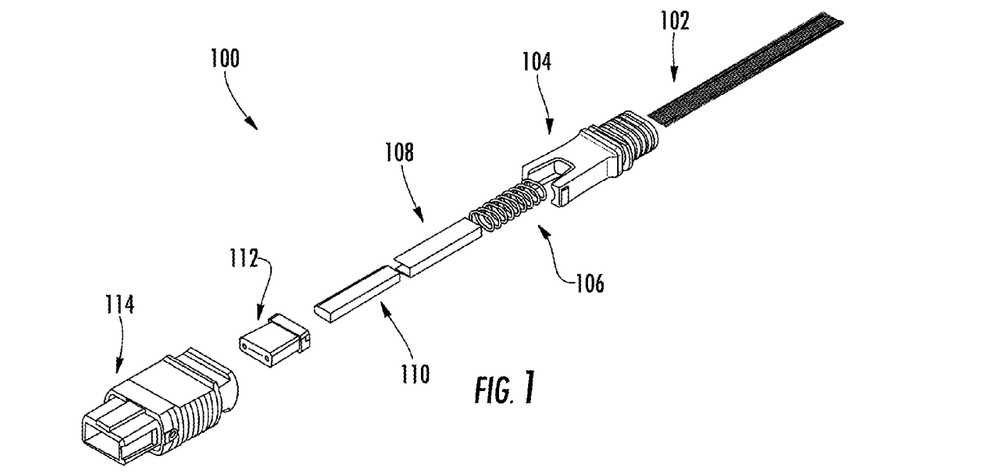
FIG. 1 depicts an exploded view of a fiber optic connector, according to embodiments disclosed herein.

Referring initially to the drawings, FIG. 1 depicts an exploded view of a fiber optic connector 100, according to embodiments disclosed herein. More specifically, a fiber optic connector 100 includes fiber cable and/or plurality of optical fibers 102, a spring push 104, a spring 106, cover portion 108, a ferrule boot 110, a multifiber ferrule 112, and a housing portion 114. Specifically, the multifiber ferrule 112 may include a ferrule body that is generally rectangular in lateral cross-section. Although an MT-style ferrule is illustrated and described herein, the multifiber ferrule 112 need not be an MT-type ferrule and may be any suitable multifiber ferrule. Regardless of the type, the multifiber ferrule 112 extends lengthwise within the fiber optic connector 100. In addition, the ferrule body defines a plurality of bores opening through the end face. The bores are arranged in a laterally extending linear row for receiving the end portions of respective optical fibers.

Although the embodiments of the multifiber ferrule 112 may include total of twelve bores such that the multifiber ferrule 112 can be mounted upon the end portions of twelve individual optical fibers, the end face may define any number of bores, such as 2, 4, 6, 8, 10 or more. In addition, the multifiber ferrule 112 may include more than a single linear row of bores. Further, the bores need not be arranged in one or more laterally extending linear rows. For example, any number of bores may be arranged in any predetermined pattern on the end face of the multifiber ferrule 112.

The multifiber ferrule 112 may also define one or more elongated guide pin holes. The guide pin holes open through the end face and are adapted to receive a respective guide pin to align the multifiber ferrule 112 with an opposing ferrule of a mating connector in a known manner. The guide pin holes defined by the ferrule body in turn define a longitudinal axis extending through the center of the guide pin hole. The multifiber ferrule 112 may be manufactured such that the longitudinal axis of each guide pin hole is substantially parallel to the bores extending lengthwise through the ferrule body and perpendicular to the end face.

As also illustrated, the cover portion 108 and the ferrule boot 110 of the embodiment shown in FIG. 1 are positioned adjacent the rear face of the multifiber ferrule 112, between the multifiber ferrule 112 and the spring 106. An opening that extends lengthwise through the spring 106 permits the end portions of the optical fibers 102 to pass through the spring 106 to the cover portion 108 and ferrule boot 110 and on to the multifiber ferrule 112.

Figures 2A, 2B:
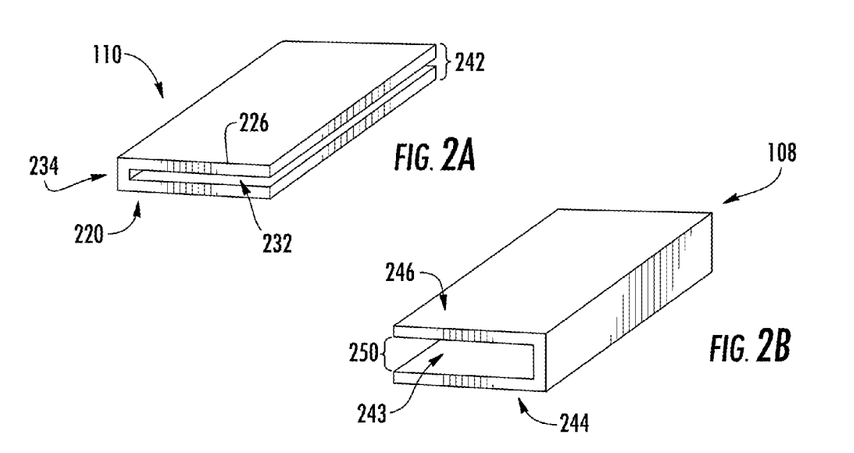
FIG. 2A depicts a C-shaped ferrule boot, such as may be used in a fiber optic connector, according to embodiments disclosed herein.
FIG. 2B depicts a cover portion for the C-shaped ferrule boot, according to embodiments disclosed here.

FIG. 2A depicts a C-shaped ferrule boot 110, such as may be used in a fiber optic connector, according to embodiments disclosed herein. As illustrated, the ferrule boot may include a plurality of extension portions 220, 226, and a connection portion 234 there between, which create a fiber alignment portion that help to define a substantially C-shaped cross section of the ferrule boot 110 as well as a first groove for receiving a first row of optical fibers. The extension portions 220, 226, further define an alignment groove 232 for receiving a first row of optical fibers. Additionally, the ferrule boot 110 may have a thickness 242 of a predetermined length.

FIG. 2B depicts a cover portion 108 for the C-shaped ferrule boot, according to embodiments disclosed here. As illustrated, the cover portion 108 may also have a C-shaped cross section, and may include a cover securing portion 246 and a base securing portion 244, which define a ferrule boot receiving area 243. The ferrule boot receiving area 243 may have a length 250 that is slightly greater than the thickness 242 for removably securing the ferrule boot 110.

Figure 2C:
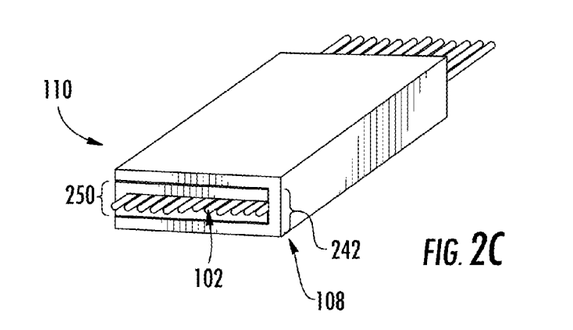
FIG. 2C depicts the C-shaped ferrule boot and cover portion, according to embodiments disclosed herein.

FIG. 2C depicts the C-shaped ferrule boot and cover portion, according to embodiments disclosed herein. As illustrated, the ferrule boot may receive a first row of optical fibers in the alignment groove 232. Additionally, the cover portion 108 may be attached to the ferrule boot to secure the fibers therein.

Figure 3A:
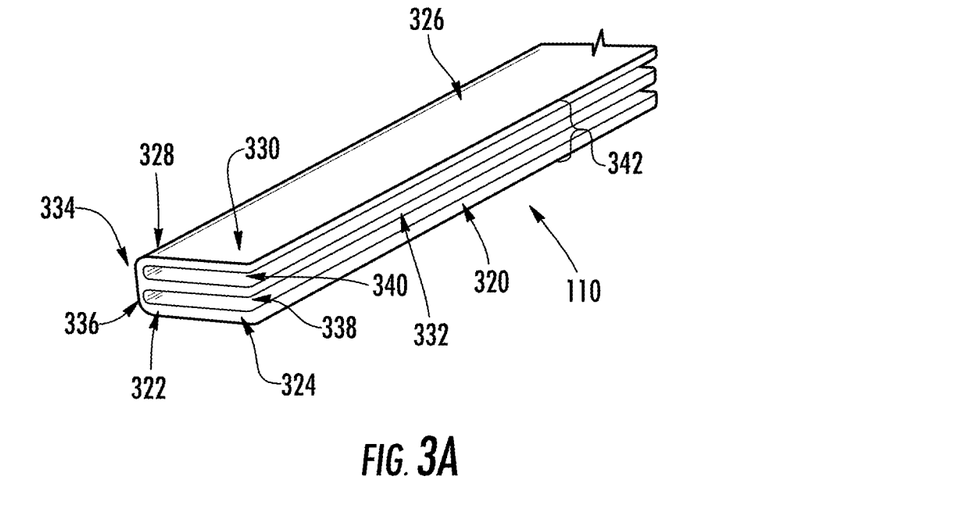
FIG. 3A depicts a ferrule boot, such as may be used in a fiber optic connector, according to embodiments disclosed herein.

FIG. 3A depicts a ferrule boot 110, such as may be used in the fiber optic connector 100, according to embodiments disclosed herein. As illustrated, the ferrule boot 110 may include three extension portions, including a base extension portion 320 (which includes a base distal end 322 and a base proximal end 324), a cover extension portion 326 (which includes a cover distal end 328 and a cover proximal end 330), and a support extension portion 332 (which includes a distal support end and a proximal support end). The base extension portion 320, the cover extension portion 326, and the support extension portion 332 may be coupled together into a substantially E-shaped cross section, with a cover connection portion 334 facilitating the connection between the cover extension portion 326 and the support extension portion 332 on the cover distal end 328 and a base connection portion 336 facilitating a connection between the support extension portion 332 and the base extension portion 320 on the base distal end 322. As illustrated, the base connection portion 336 couples to the base distal end 322 of the base extension portion 320. Similarly, the cover connection portion 334 couples to the cover distal end 328 of the cover extension portion 326. Depending on the particular embodiment, the cover connection portion 334 and the base connection portion 336 may be configured as a single component (as in FIG. 3A), while in other embodiments the two portions may be separate and distinct.

Accordingly, the ferrule boot 110 defines a first alignment portion 338, which defines a first groove between the base extension portion 320 and the support extension portion 332. The first alignment portion 338 may define a fiber receiving length, which may extend from the base connection portion 336 to the base proximal end 324 of the base extension portion 320. Depending on the particular embodiment, the fiber receiving length may be approximately the total width of a predetermined number of fibers being received in the first alignment portion 338. Similarly, the ferrule boot 110 defines a second fiber alignment portion 340, which defines a second groove between the support extension portion 332 and the cover extension portion 326. The second fiber alignment portion 340 may also include a fiber receiving length that extends from the cover connection portion 334 to the cover proximal end 330 of the cover extension portion 326. Depending on the particular embodiment, this fiber receiving length may be approximately the total width of a predetermined number of fibers being received in the second fiber alignment portion 340. In these areas, the optical fibers 102 may be inserted and secured for alignment with the multifiber ferrule 112. The ferrule boot 110 may define an exterior thickness 342, measured as a distance between an exterior portion of the base extension portion 320 and the cover extension portion 326.

Figure 3B:
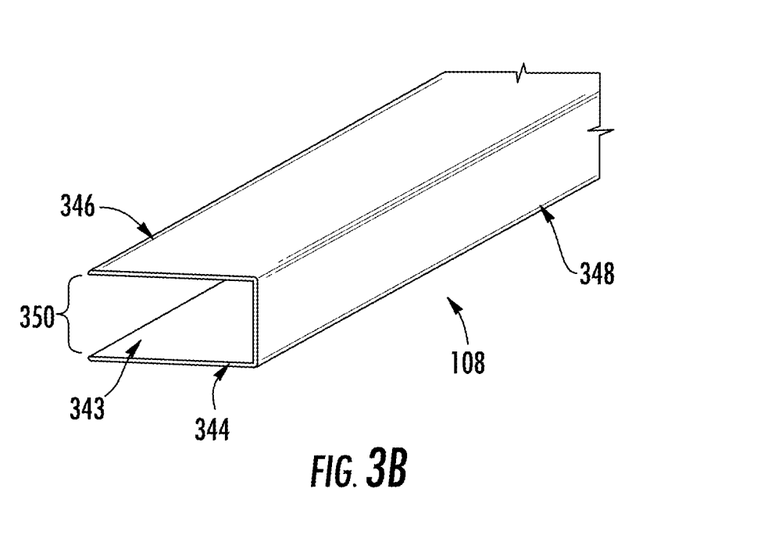
FIG. 3B depicts a securing component for attaching to the ferrule boot, according to embodiments disclosed herein.

FIG. 3B depicts a cover portion 108 for attaching to the ferrule boot 110, according to embodiments disclosed herein. As illustrated, the cover portion 108 includes a base securing portion 344 and a cover securing portion 346, which are coupled together by a securing connection portion 348. As illustrated, the cover portion 108 may take the form of a "C" configuration and may define a ferrule boot receiving area 343 that has an interior thickness 350, which is a distance measured from an inner portion of the base securing portion 344 to an inner portion of the cover securing portion 346. In some embodiments, the interior thickness 350 is substantially the same as the exterior thickness 342 such that the cover portion 108 can fit around the ferrule boot 110, such that the cover portion 108 is removably secured to the ferrule boot 110.

Figure 3C:
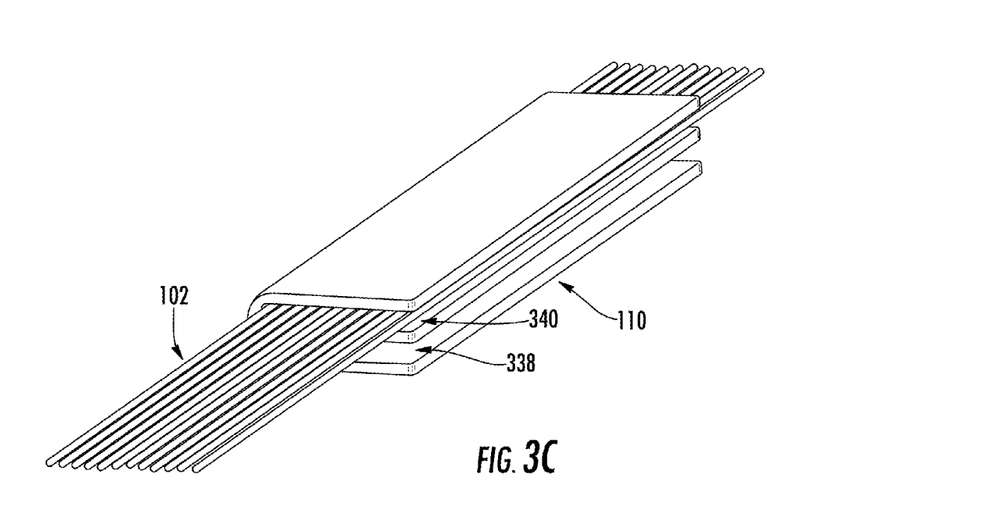
FIG. 3C depicts the ferrule boot, with fibers positioned within, according to embodiments disclosed herein.

FIG. 3C depicts the ferrule boot 110, with optical fibers 102 positioned within, according to embodiments disclosed herein. As illustrated, the optical fibers 102 are inserted into the second fiber alignment portion 340. By placing the optical fibers 102 into the second fiber alignment portion 340, the fibers may be aligned for coupling with the multi-fiber ferrule 112. Additionally, in some embodiments, one or more fibers may be inserted into the first alignment portion 338 to provide a second (or different) layer of fiber alignment. Depending on the particular embodiment, the optical fibers 102 may be laterally received (e.g. received at the base proximal end 324 and moved toward the base distal end 322) in the first alignment portion 338 and/or second fiber alignment portion 340. In some embodiments, the fibers may be received longitudinally.

Figure 3D:
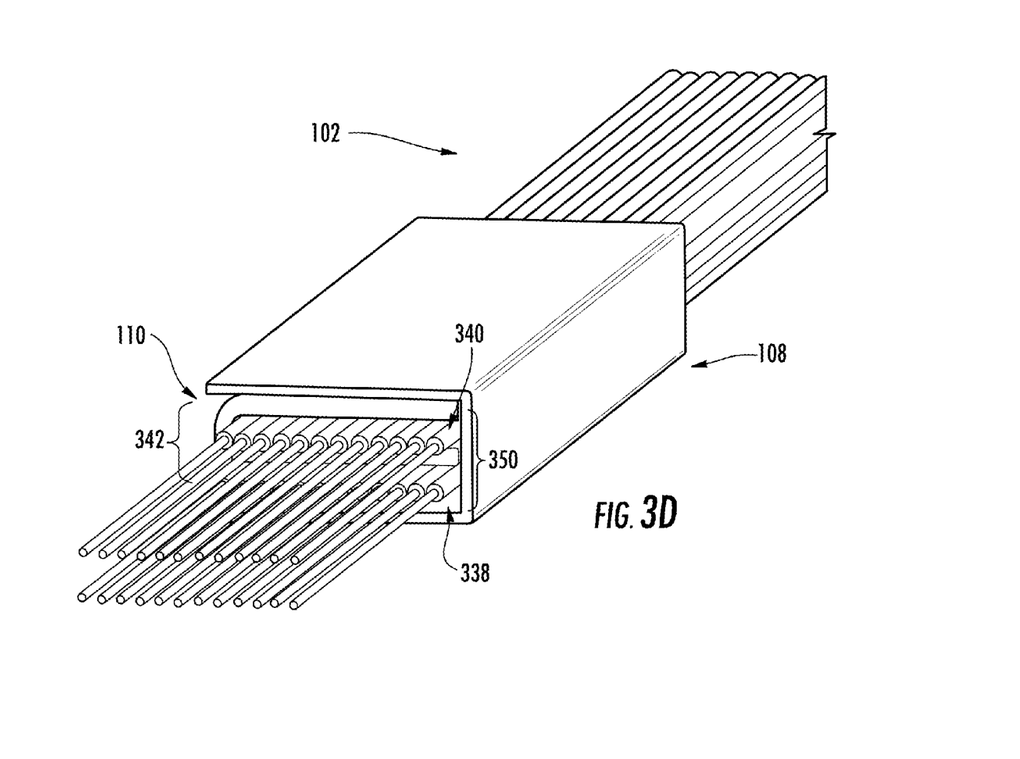
FIG. 3D depicts the ferrule boot assembly, including the fiber boot and securing component, with fibers positioned within, according to embodiments disclosed herein.

FIG. 3D depicts the ferrule boot 110 and cover portion 108, with optical fibers 102 positioned within, according to embodiments disclosed herein. As illustrated, in addition to optical fibers 102 being inserted into the second fiber alignment portion 340, optical fibers 102 may also be inserted into the first alignment portion 338. Additionally, the cover portion 108 may be coupled with the ferrule boot 110. As discussed above, the cover portion 108 has an interior thickness 350 that is substantially the same as the exterior thickness 342, such that the cover portion 108 is removably secured with a frictional connection around the ferrule boot 110.

It should be understood that, while the embodiments of FIGS. 3A-3D include two fiber receiving areas (e.g., the first alignment portion 338 and the second fiber alignment portion 340), this is merely an example. More specifically, at least one additional receiving area may be defined by at least one additional extension portions and additional connection portions, which may be configured substantially similarly as depicted in FIGS. 3A-3D. In such embodiments, multiple rows of optical fibers may be housed. Some embodiments may include a plurality of additional fiber receiving areas.

Figures 4A, 4B:
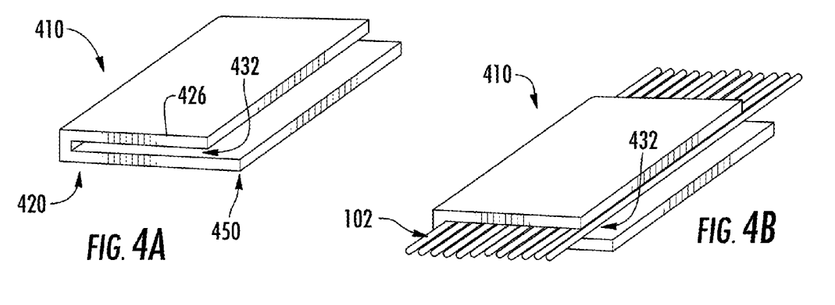
FIG. 4A depicts a C-shaped ferrule boot with a bendable extension portion, according to embodiments disclosed herein.
FIG. 4B depicts a C-shaped ferrule boot with optical fibers inserted therein, according to embodiments disclosed herein.

FIG. 4A depicts a C-shaped ferrule boot 410 with a bendable extension portion, according to embodiments disclosed herein. As illustrated, the ferrule boot 410 may have a substantially C-shaped cross section and may include a first extension portion 420 and a second extension portion 426. The first extension portion 420 and the second extension portion 426 define a fiber alignment portion 432 for receiving a row of optical fibers. Also included in the embodiment of FIG. 4A is a cover portion 450, which may be constructed of a bendable material for bending toward the second extension portion.

FIG. 4B depicts a C-shaped ferrule boot 410 with a row of optical fibers 102 inserted therein, according to embodiments disclosed herein. More specifically, the row of optical fibers 102 may be placed in the fiber alignment portion 432 for alignment.

Figure 4C:
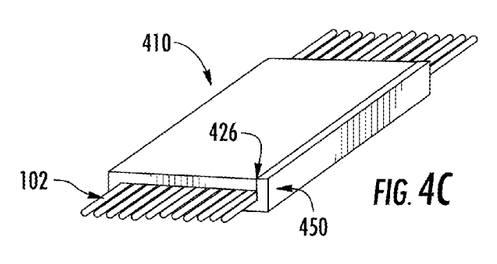
FIG. 4C depicts a C-shaped ferrule boot with the cover portion bent to secure the optical fibers, according to embodiments disclosed herein.

FIG. 4C depicts a C-shaped ferrule boot 410 with the cover portion 450 bent to secure the optical fibers, according to embodiments disclosed herein. As illustrated, the cover portion 450 may be bent toward the second extension portion 426 to cover the fiber alignment portion 432. This allows the row of optical fibers 102 to be aligned and secured within the ferrule boot 410.

Figure 5A:
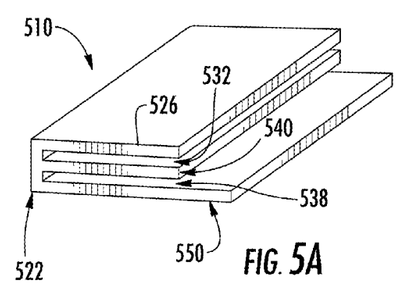
FIG. 5A depicts an E-shaped ferrule boot with a bendable cover portion, according to embodiments disclosed herein.

FIG. 5A depicts an E-shaped ferrule boot 510 with a bendable cover portion 550, according to embodiments disclosed herein. As illustrated, the ferrule boot 510 may be configured with a substantially E-shaped cross section. As such, the ferrule boot 510 may include a first extension portion 522, a second extension portion 526, and a third extension portion 540. The extension portions 522, 526, and 540 may define fiber alignment portions 532 and 538. Additionally included is a cover portion 550, which may be integral with the extension portion 522 and may be constructed of a bendable material to be bent toward the second extension portion 526.

Figure 5B:
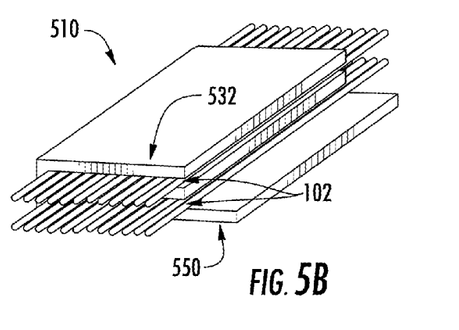
FIG. 5B depicts an E-shaped ferrule boot with optical fibers inserted therein, according to embodiments disclosed herein.

FIG. 5B depicts an E-shaped ferrule boot 510 with optical fibers 102 inserted therein, according to embodiments disclosed herein. As illustrated, a first row of optical fibers 102 and a second row of optical fibers 102 may be inserted into the fiber alignment portions 532, 538 for alignment and securing.

Figure 5C:
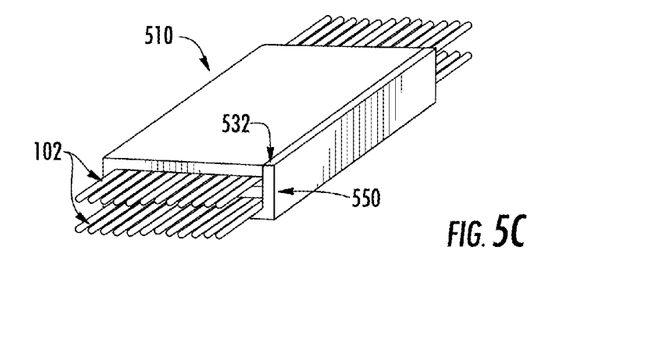
FIG. 5C depicts an E-shaped ferrule boot with the cover portion bent to secure the optical fibers, according to embodiments disclosed herein.

FIG. 5C depicts an E-shaped ferrule boot 510 with the cover portion 550 bent to secure the optical fibers 102, according to embodiments disclosed herein. As illustrated, the cover portion 550 may be bent toward the second extension portion 532 to cover the fiber alignment portions 532, 538, thereby securing the first row of optical fibers 102 and the second row of optical fibers 102.

It should be understood that while the embodiments of FIGS. 2A-5C depict ferrule boots with three or less extension portions, these are merely examples. More specifically, some embodiments may include a ferrule boot that defines includes a plurality of additional extension portions (e.g., more than 3 extension portions), defining a plurality of additional fiber alignment portions (e.g., more than two fiber alignment portions) and thus a plurality of additional grooves (e.g., more than two grooves) for receiving rows of optical fibers, while still defining an substantially E-shaped cross section.

Figure 6A:
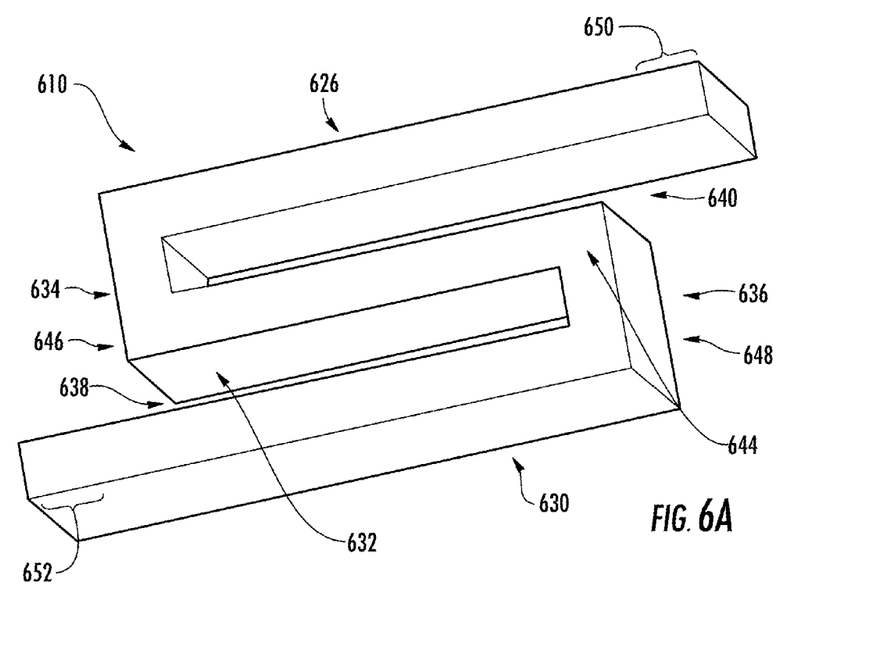
FIG. 6A depicts an S-shaped ferrule boot, according to embodiments disclosed herein.

FIG. 6A depicts another embodiment of the ferrule boot 610, according to embodiments disclosed herein. As illustrated, the ferrule boot 610 may include a substantially S-shaped cross section and may include a plurality of extension portions, including a base extension portion 630, a support extension portion 632, and a cover extension portion 626. The base extension portion 630 may be coupled to a base connection portion 636, which is coupled to the support extension portion 632. Similarly, the cover extension portion may be coupled to a cover connection portion 634, which is also coupled to the support extension portion. Additionally, the base extension portion 630 may include an extension portion 652 that extends beyond the cover connection portion 634. Similarly, the cover extension portion 626 may include a distal connection end, a proximal connection end, and an extension portion 650 that extends beyond the base connection portion 636.

As such, the embodiment of FIG. 6A is structured as an "S" configuration, which defines a base fiber receiving area 638 with a fiber receiving length from the base connection portion 636 to distal support end 646 and a cover fiber receiving area 640 with a fiber receiving length from the cover connection portion 634 to a proximal support end 644 for receiving fibers.

Accordingly, at least a portion of the ferrule boots 110, 410, 510, and 610 may be constructed of a flexible material for bending the cover extension portion 626 and the base extension portion 630 toward the support extension portion 632 to secure fibers within the cover fiber receiving area 640 and the base fiber receiving area 638, respectively. Additionally, in some embodiments, the extension portions 650, 652 may extend beyond the support extension portion 632. This may allow the portions of the base extension portion 630 and the cover extension portion 626 that extend beyond the ends of the support extension portion 632 to be bent around the base connection portion 636 and the cover connection portion 634, respectively. This may serve to further secure the optical fibers 102 within the base fiber receiving area 638 and the cover fiber receiving area 640.

It should be understood that, depending on the particular embodiment, the ferrule boot 610 from FIG. 6A may be utilized in a fiber optic connector, similar to that illustrated in FIG. 1. Regardless of the type of fiber optic connector, the ferrule boot 610 may be utilized to align fibers for introduction to a ferrule, such as the multifiber ferrule 112, from FIG. 1.

Figure 6B:
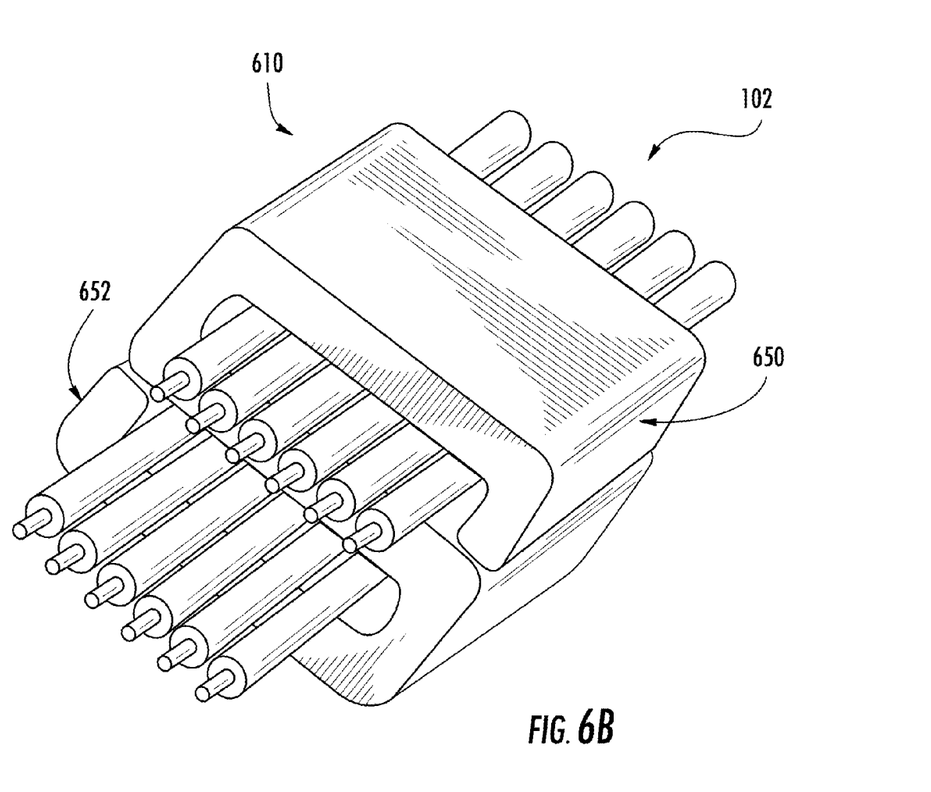
FIG. 6B depicts the S-shaped ferrule boot, with optical fibers secured, according to embodiments disclosed herein.

FIG. 6B depicts another embodiment of the ferrule boot 610, with optical fibers secured, according to embodiments disclosed herein. As illustrated, the ferrule boot 610 may receive optical fibers 102 in the fiber receiving areas 638, 640. Additionally, the extension portions 650, 652 may be bent toward the connection portions 634, 626 to secure the optical fibers 102 in place and aligned in a predetermined arrangement.

Figure 7:
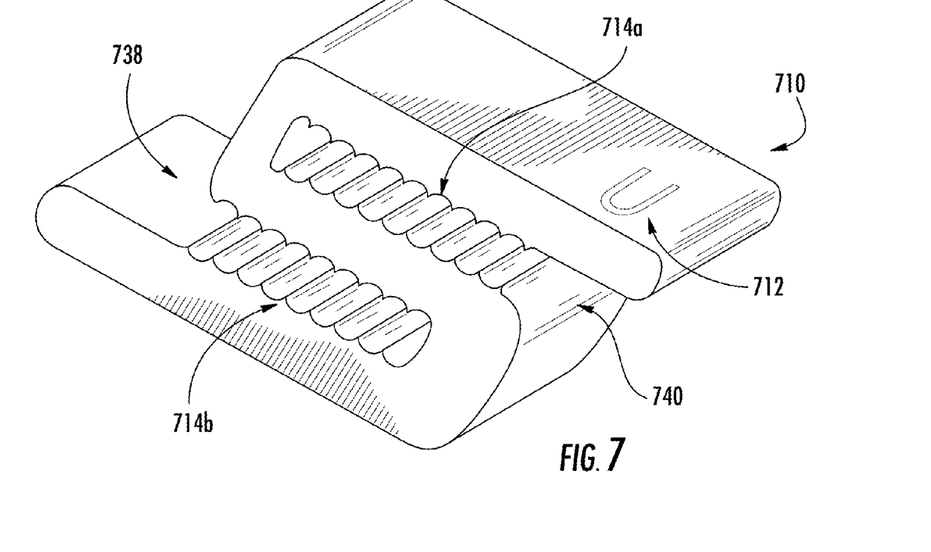
FIG. 7 depicts the S-shaped ferrule boot, with alignment slots and a polarity indicator, according to embodiments disclosed herein.

FIG. 7 depicts another embodiment of a ferrule boot 710, with alignment slots 714a, 714b and a polarity indicator 712, according to embodiments disclosed herein. As illustrated, the ferrule boot 710 may be configured with a polarity indicator 713. As an example, a "U" shaped (or other shaped) symbol may be positioned and aligned to indicate a predetermined polarity of the optical fibers 102 that are supported in the ferrule boot 710. Additionally, in some embodiments, the ferrule boot 710 may include a plurality of alignment slots 714a, 714b for receiving the optical fibers 102. More specifically, the plurality of alignment slots 714a, 714b may be configured as indentations in the base fiber receiving area 738 and/or in the cover fiber receiving area 740 to secure the optical fibers 102. The plurality of alignment slots 714a, 714b may be any number but may be configured to match with the bores of the ferrule and may be utilized to ensure that the optical fibers 102 do not become misaligned and/or out of order. Additionally, the plurality of alignment slots 714a, 714b may be color coded to further indicate the order that the optical fibers 102 are to be placed in the ferrule boot 710. As an example, a first alignment slot (e.g., the alignment slot 714a) may be yellow, while a second alignment slot (e.g., the alignment slot 714b) may be green. The other alignment slots may similarly be of different colors, textures, etc. Similarly, in some embodiments, the alignment slots 714 may be numbered to indicate this order. Other identification may also be provided.

Figure 8:
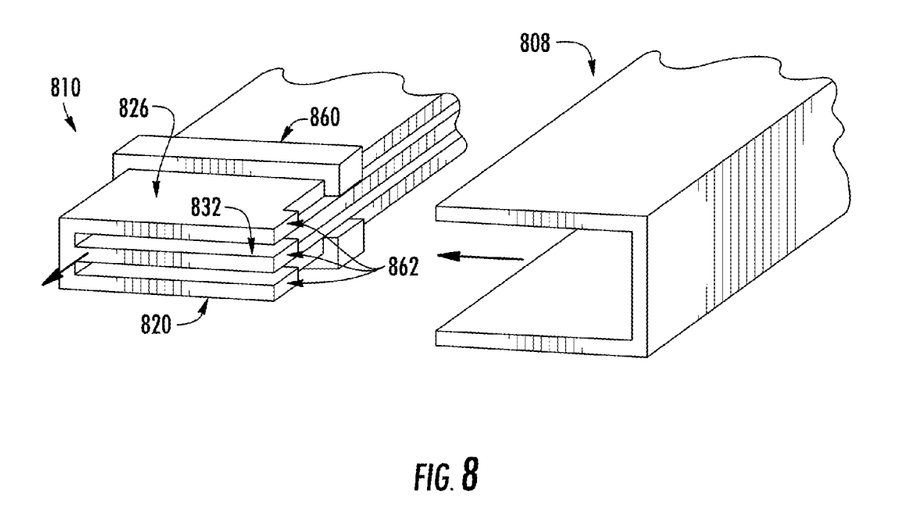
FIG. 8 depicts an E-shaped ferrule boot with alignment features, according to embodiments disclosed herein.

FIG. 8 depicts an E-shaped ferrule boot 810 with alignment features 860, 862, according to embodiments disclosed herein. As illustrated, the ferrule boot 810 may be configured with a substantially E-shaped cross section and may include extension portions 820, 826, and 832, as described above. However, in this embodiment, the ferrule boot 810 also includes a first alignment feature 860 and a second alignment feature 862. The first alignment feature 860 may be configured as portion that extends from an exterior surface of the ferrule boot 810. The alignment feature 860 may be integral to the fiber alignment portion of the ferrule boot 810 and may extend from the ferrule boot 810 such that the profile of the cover portion 808 is smaller than the alignment feature 860. Thus, when the ferrule boot 810 is coupled with the multifiber ferrule 112 (FIG. 1), the alignment feature 860 is positioned to abut to an external portion of the multifiber ferrule 112. This allows the ferrule boot 810 to easily couple with the multifiber ferrule 112, without the cover portion 808 intruding on that coupling.

Similarly, the alignment feature 862 may be configured as one or more features that extend from the extension portions. The alignment features 862 may be integral to the fiber alignment portion and may extend from the fiber alignment portion to abut with an interior surface of the multifiber ferrule 112 to further secure the ferrule boot 810 inside the ferrule. Additionally, the alignment features 862 may have a profile equal to or beyond the profile of the cover portion 808.

Figure 9:
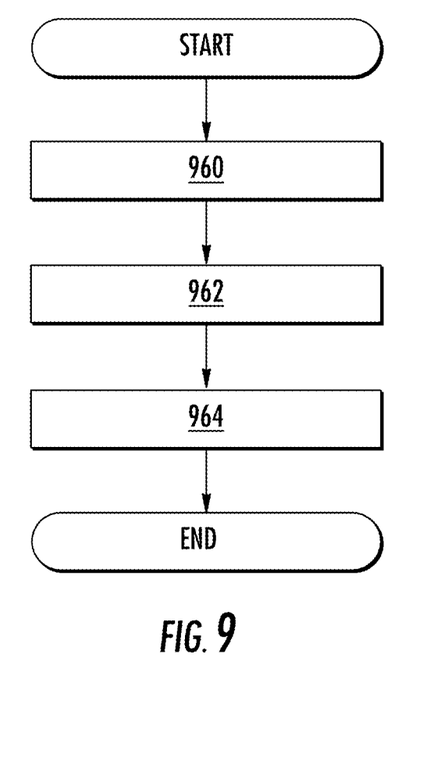
FIG. 9 depicts a flowchart for providing a ferrule boot, according to embodiments disclosed herein.

FIG. 9 depicts a flowchart for providing a ferrule boot 110, 310, according to embodiments disclosed herein. As illustrated in block 960, a first fiber may be laterally received at a base fiber receiving area of a ferrule boot. In some embodiments, the base fiber receiving area includes a first area between a base extension portion and a support extension portion. In block 963, a second fiber may be laterally received at a cover fiber receiving area of the ferrule boot. In some embodiments, the cover fiber receiving area includes a second area between a cover extension portion and the support extension portion. In block 964, the first fiber may be secured within the base fiber receiving area and the second fiber within the cover fiber receiving area.

Figure 10:
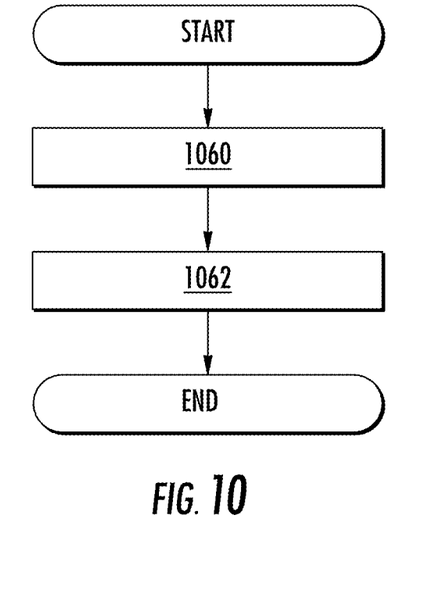
FIG. 10 depicts another flowchart for providing a ferrule boot, according to embodiments disclosed herein.

FIG. 10 depicts another flowchart for providing a ferrule boot, according to embodiments disclosed herein. As illustrated in block 1060, a first row of optical fibers may be inserted into a first groove of a fiber alignment portion of a ferrule assembly. In block 1062, the first row of optical fibers may be secured within the first groove with a cover portion of the ferrule assembly.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

We claim:

1. A fiber optic connector for a plurality of optical fibers, comprising:
a housing portion;
a ferrule assembly at least partially disposed in the housing portion, the ferrule assembly comprising:
a ferrule having a plurality of bores arranged in at least two linear rows, the ferrule defining an end face of the fiber optic connector; and
a ferrule boot coupled to the ferrule, the ferrule boot including a fiber alignment portion and a cover portion, wherein the fiber alignment portion defines a first groove for a first row of the optical fibers and a second groove for a second row of the optical fibers;
a spring push positioned behind the ferrule; and
a spring positioned between the spring push and ferrule;
wherein the optical fibers can pass through an opening in the spring, through the ferrule boot, and into the ferrule;
wherein the cover portion comprises a substantially C-shaped cross section and is removably secured to an exterior portion of the fiber alignment portion to secure the first and second rows of optical fibers in the respective first and second grooves.

2. The fiber optic connector of claim 1, wherein the fiber alignment portion comprises at least three extension portions to define the first and second grooves between the at least three extension portions.

3. The fiber optic connector of claim 2, wherein the at least three extension portions form a substantially E-shaped cross section of the fiber alignment portion.

4. The fiber optic connector of claim 2, wherein the at least three extension portions form a substantially S-shaped cross section of the fiber alignment portion.

5. The fiber optic connector of claim 2, wherein the fiber alignment portion comprises more than three extension portions to define at least one additional groove for at least one additional row of optical fibers.

6. The fiber optic connector of claim 1, wherein the first and second grooves each comprise a plurality of alignment slots for receiving individual optical fibers, wherein the plurality of alignment slots are color coded.

7. The fiber optic connector of claim 1, wherein the fiber alignment portion comprises an alignment feature that is integral to the fiber alignment portion and extends from the fiber alignment portion to abut with the ferrule.

8. The fiber optic connector of claim 7, wherein the alignment feature extends from the fiber alignment portion to abut with an exterior portion of the ferrule.

9. The fiber optic connector of claim 7, wherein the alignment feature extends from the fiber alignment portion to abut with an interior surface of the ferrule.

10. A fiber optic connector, comprising:
a housing portion;
a ferrule assembly at least partially disposed in the housing portion, the ferrule assembly comprising:
a ferrule having a plurality of bores arranged in at least two linear rows, the ferrule defining an end face of the fiber optic connector; and
a ferrule boot coupled to the ferrule, the ferrule boot including a fiber alignment portion and a cover portion;
a spring push positioned behind the ferrule; and
a spring positioned between the spring push and ferrule;
a plurality of optical fibers arranged in at least a first row and a second row, wherein:
the fiber alignment portion of the ferrule boot defines a first groove for the first row of optical fibers and a second groove for the second row of optical fibers:
the optical pass through an opening in the spring, through the ferrule boot, and into the ferrule; and
the cover portion of the ferrule boot comprises a substantially C-shaped cross section and is removably secured to an exterior portion of the fiber alignment portion to secure the first and second rows of optical fibers in the respective first and second grooves.

11. The fiber optic connector of claim 10, wherein the fiber alignment portion comprises at least three extension portions to define the first and second grooves between the at least three extension portions.

12. The fiber optic connector of claim 11, wherein the at least three extension portions form a substantially E-shaped or substantially S-shaped cross section of the fiber alignment portion.

13. The fiber optic connector of claim 11, wherein the fiber alignment portion comprises more than three extension portions to define at least one additional groove for at least one additional row of optical fibers.

14. A fiber optic connector for a plurality of optical fibers, comprising:
a housing portion;
a ferrule assembly at least partially disposed in the housing portion, the ferrule assembly comprising:
a ferrule having a plurality of bores arranged in at least one linear row, the ferrule defining an end face of the fiber optic connector; and
a ferrule boot coupled to the ferrule, the ferrule boot including a fiber alignment portion and a cover portion, wherein the fiber alignment portion defines at least one groove for the at least one row of the optical fibers;
a spring push positioned behind the ferrule; and
a spring positioned between the spring push and ferrule;
wherein the optical fibers can pass through an opening in the spring, through the ferrule boot, and into the ferrule;
wherein the cover portion comprises a substantially C-shaped cross section and is removably secured to an exterior portion of the fiber alignment portion to secure the at least one linear row of optical fibers in the at least one groove.

15. The fiber optic connector of claim 14, wherein the at least one groove each comprise a plurality of alignment slots for receiving individual optical fibers, wherein the plurality of alignment slots are color coded.

16. The fiber optic connector of claim 14, wherein the fiber alignment portion comprises an alignment feature that is integral to the fiber alignment portion and extends from the fiber alignment portion to abut with the ferrule.

17. The fiber optic connector of claim 16, wherein the alignment feature extends from the fiber alignment portion to abut with an exterior portion of the ferrule.

18. The fiber optic connector of claim 16, wherein the alignment feature extends from the fiber alignment portion to abut with an interior surface of the ferrule.

19. A fiber optic connector, comprising:
a housing portion;
a ferrule assembly at least partially disposed in the housing portion, the ferrule assembly comprising:
a ferrule having a plurality of bores arranged in at least two linear rows, the ferrule defining an end face of the fiber optic connector; and
a ferrule boot coupled to the ferrule, the ferrule boot including a fiber alignment portion and a cover portion;
a spring push positioned behind the ferrule; and
a spring positioned between the spring push and ferrule;
a plurality of optical fibers arranged in at least one linear row, wherein:
the fiber alignment portion of the ferrule boot defines at least one groove for the at least one linear row of optical fibers:
the optical pass through an opening in the spring, through the ferrule boot, and into the ferrule; and
the cover portion of the ferrule boot comprises a substantially C-shaped cross section and is removably secured to an exterior portion of the fiber alignment portion to secure the at least one linear row of optical fibers in the at least one groove.

* * * * *